No. 792,571. PATENTED JUNE 13, 1905.
A. F. CHRISTMAS.
ELECTRIC MOTOR SYSTEM.
APPLICATION FILED SEPT. 23, 1904.

2 SHEETS—SHEET 2.

WITNESSES.

INVENTOR.

No. 792,571.                                                                    Patented June 13, 1905.

UNITED STATES PATENT OFFICE.

ADOLPH F. CHRISTMAS, OF PITTSBURG, PENNSYLVANIA, ASSIGNOR OF TWO-THIRDS TO FRANK R. McFEATTERS, OF WILKINSBURG, PENNSYLVANIA.

ELECTRIC-MOTOR SYSTEM.

SPECIFICATION forming part of Letters Patent No. 792,571, dated June 13, 1905.

Application filed September 23, 1904. Serial No. 225,683.

*To all whom it may concern:*

Be it known that I, ADOLPH F. CHRISTMAS, a resident of Pittsburg, in the county of Allegheny and State of Pennsylvania, have invented a new and useful Improvement in Electric-Motor Systems; and I do hereby declare the following to be a full, clear, and exact description thereof.

My invention relates to electrical-motor systems, and more especially to a system for operating reciprocating electric motors provided with a plurality of coils.

One object of my invention is to provide such a motor system with means for varying the time of closing the circuit to the coil giving the forward or working stroke of the motor so as to start said stroke at the exact instant that the core reaches the limit of its return stroke in order to bring the energization of the coil into exact synchronism with the vibration of the core.

Another object of my invention is to provide such a motor system wherein the duration of the energization of the two coils of the motor may be varied so as to get a strong quick forward pull on the core and a weaker and slower backward pull, in that manner securing the greatest efficiency of the motor with the least expenditure of electrical energy.

Figure 1:
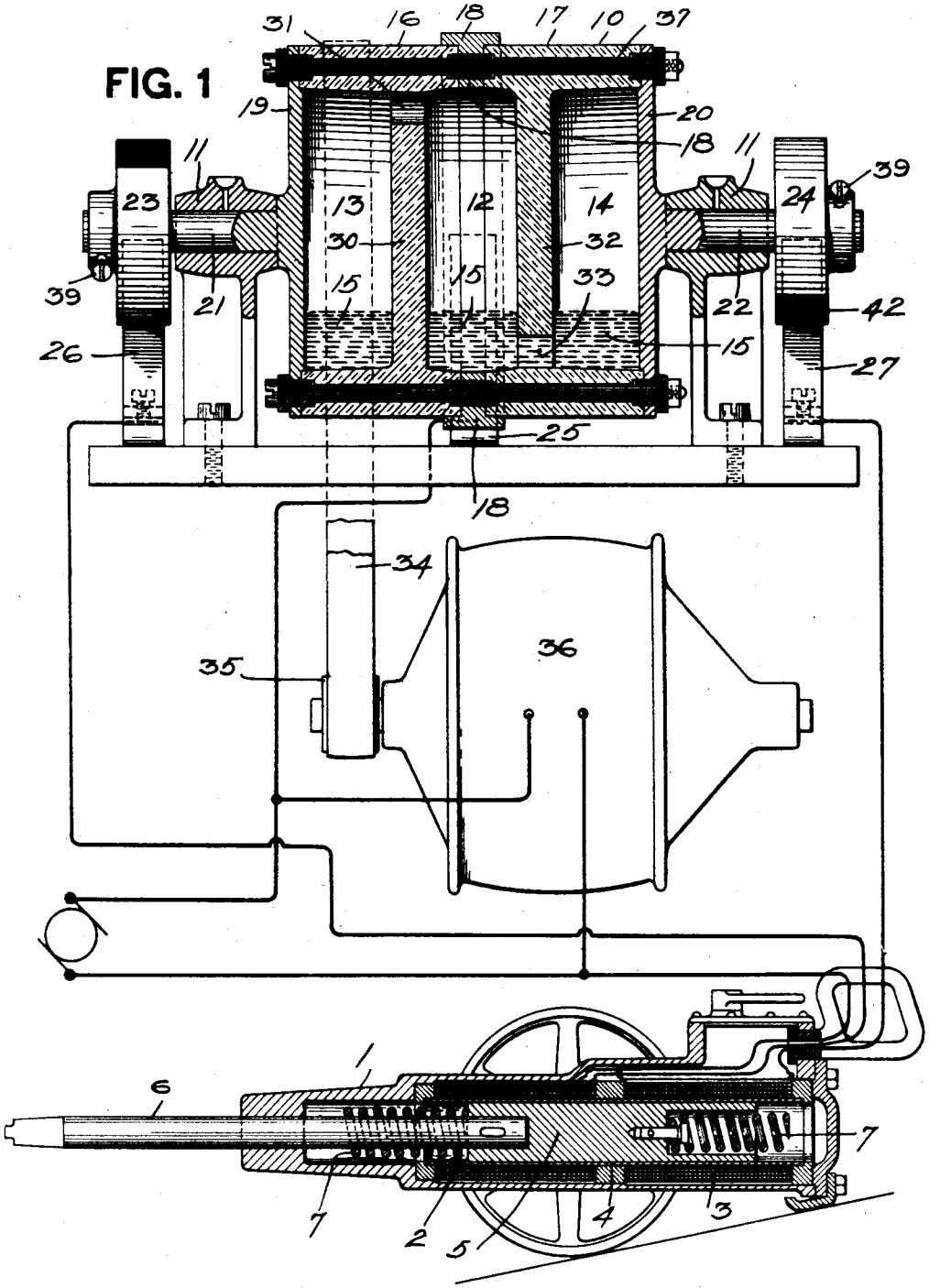
Figure 2:
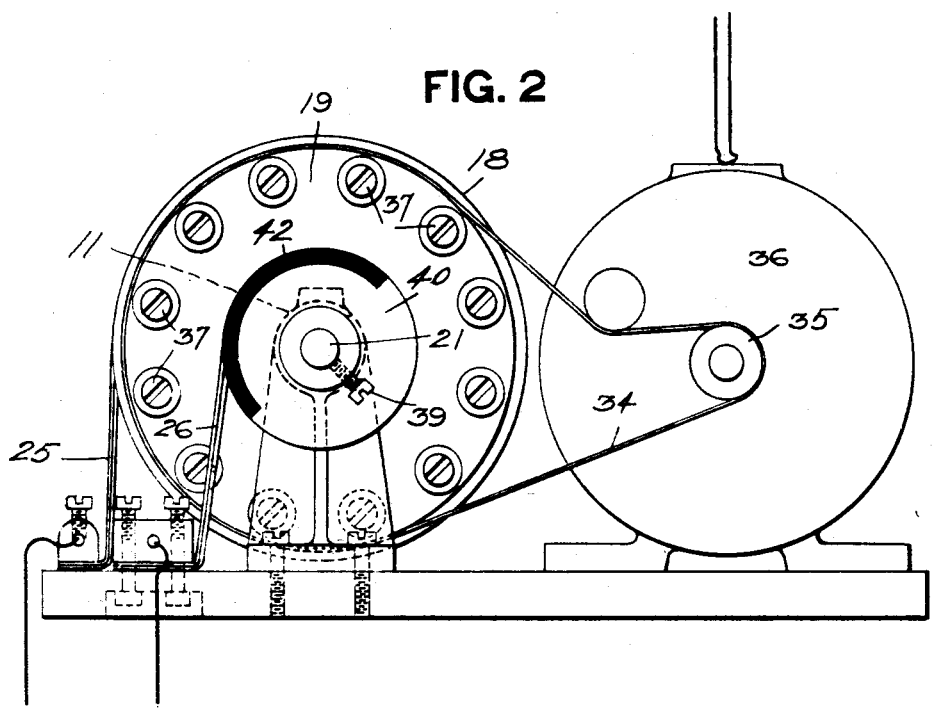

In the accompanying drawings, Figure 1 is a diagram of the system, the motor and circuit maker and breaker being shown in section; and Fig. 2 is an end view of the circuit-breaker, showing the manner of adjustment.

My invention is intended to operate with reciprocating motors provided with two coils. Such a motor is shown in the drawings and has been illustrated as a reciprocating hammer or coal-breaker. This motor is provided with any suitable frame or casing 1 and has therein the coils 2 and 3. In these coils is the sleeve or bobbin 4, in which reciprocates the core or armature 5, the latter performing the desired work—such, for instance, as operating a suitable tool 6. This core is preferably cushioned at the limit of its stroke in both directions by suitable springs or air-cushions 7. The active or working stroke of the core 5 is secured by the energization of the coil 2, and its return stroke is secured by the energization of the coil 3. The coils 2 and 3 are energized alternately and only momentarily, thus getting a strong magnetic pull on the core and at the same time preventing the heating of the coils of the motor, as would be the case if current were switched directly from one coil to the other without any appreciable interval of time between the same. This alternate energization of the coils may be secured by any suitable circuit making and breaking device; but preferably I employ a rotary mercury circuit making and breaking device of the general character described and claimed in my Patent No. 773,121, October 25, 1904. This circuit making and breaking device I modify and provide with adjusting means, so that the time of energizing the coil 2 can be varied and also so that the duration of the energization of the two coils may be varied, the first adjustment being for the purpose of energizing the coil 2 at the exact moment the core reaches the limit of its return stroke, thus getting the coil in synchronism with the oscillation of said core, and the latter adjustment being for the purpose of getting a strong and quick forward stroke and a slower and weaker return stroke. I have therefore illustrated a circuit maker and breaker such as described and claimed in my application, Serial No. 225,684, filed concurrently herewith. This circuit interrupter and changer comprises a body 10, mounted to rotate in suitable bearings 11 and provided with three chambers 12, 13, and 14, which are insulated from each other and each of which contains a body of mercury 15, which only partially fills the chamber. The insulation of these chambers may be secured by any suitable means. In the drawings this effect is secured by making the body of suitable insulating material, such as porcelain, glass, fiber, or the like. This body is formed in two sections 16 and 17, which have interposed between the same a metallic ring 18, forming an annular metallic terminal exposed in the central chamber 12. The ends of the chambers 13 and 14 are closed by means of metallic heads 19 and 20, respectively, which are provided with trunnions 21 and 22, upon which the body is mounted. On said trunnions are the collector-rings 23 and 24. Bearing against the ring 18 is a brush 25, connected to one pole of the circuit, and bearing against the collector-ring 23 is a brush 26, connected to one of the coils of the motor—for instance, the coil 2—and bearing against the other collector-ring 24 is a similar brush 27, connected to the other coil of the motor—namely, the coil 3. The electric connection between the several chambers is made by providing the partitions or walls separating said chambers with suitable openings through which the mercury can flow into contact to establish the electric circuit. The partition 30 between the chambers 12 and 13 is provided with an opening 31, and the partition 32 between the chambers 12 and 14 is provided with a similar opening 33. These two openings are arranged substantially opposite to each other, so that only one of said openings can be below the surface of the mercury at any one time, and said openings in the rotation of the body will alternately dip under the surface of the mercury. In this way the circuit is made from the chamber 12 alternately to the chambers 13 and 14, and therefore alternately to the coils 2 and 3.

The body 1 will be rotated in any suitable way, so as to direct the current alternately to the coils 2 and 3. In the drawings I have shown the body thereof connected by a belt 34 to a pulley 35 on the armature-shaft of a motor 36, which is bridged across the mains. In this manner the body will be given a constant rotary movement, so as to bring the openings 31 and 33 alternately underneath the surface of the mercury and permit the current to be established alternately to the coils 2 and 3, as will be readily understood. The openings 31 and 33 are of only small section in the arc in which they travel, and as a consequence the circuit will be established for only a short period of time—only that required for the openings to sweep through the mercury. In this way the coils will be energized for only a portion of the time, sufficient to give a good strong magnetic pull on the core, but not sufficient to cause detrimental heating thereof.

In the operation of the system as far as described the circuit-breaker will be continuously and uniformly rotated. The mercury will remain in the lower portion of the chambers. When one of the openings—say the opening 33—passes down in the mercury, the mercury of the chambers 12 and 14 will flow through said opening into contact, thus establishing the circuit from the brush 25, through the ring 18, the mercury in the chambers 12 and 14, through the head 26, trunnion 22, collector-ring 24, and brush 27 to the coil 3 of the motor, and from there back to the generator. This will result in retracting the core 5 of the motor. This energization will only last for a short period of time, for as soon as the opening 33 passes above the surface of the mercury the current will be broken. Any arc formed at this point will merely expend itself in volatilizing the mercury, which, however, will again condense, so that no damage results. In the further rotation of the body the opening 31 will next come underneath the surface of the mercury, thus permitting the mercury in the chambers 12 and 13 to flow into contact. The circuit in this case will be from the chamber 12 into the chamber 13, through the head 19, trunnion 21, collector-ring 23, and brush 26 to the coil 2 of the motor, and thence back to the generator, thus energizing said coil and causing the forward or working stroke of the core 5. This action will continue uninterruptedly as long as the circuit-breaker is kept in rotation.

It may happen that the coil 2 will not be energized the instant the core reaches the limit of its rearward stroke, so that said core would come to a pause or vibrate slightly forward and back. It is desirable to avoid this. To secure this result, I provide means for adjusting the angular relations of the holes 31 and 33 so as to secure the energization of the coil 2 at the very instant that the core reaches the limit of its return stroke, thus getting the circuit-maker into exact synchronism with the vibration of the core of the motor. This result may be accomplished in various ways. As shown in the drawings, the two sections 16 and 17 of the circuit-breaker body are secured together by means of bolts 37 passing through openings in said sections and suitably insulated from the metallic parts of the body. In the drawings twelve such holes are shown for securing the two sections together. It is obvious that by taking out all of the bolts the two sections may be adjusted angularly with reference to each other through the distance between two adjacent holes for the bolts or, when twelve bolts are used, through an angle of thirty degrees. The bolts are then again applied to hold the two sections of the body together; but the openings 31 and 33 will not be exactly opposite each other, but will have been removed from such portion by thirty degrees. By varying the number of bolts and holes various other angular adjustments can be secured. In this manner it is possible to adjust the angular relation between the holes 31 and 33 so that the coil 2 will be energized at exactly the instant when the core reaches the limit of its return stroke, thus getting the same into exact synchronism with the vibration of said core.

In order to secure a stronger and quicker pull on the core on its forward stroke than on its backward stroke, I provide adjusting means for varying the duration of the energization of the two coils. This also may be accomplished in various ways, and, as shown in the drawings, the two collector-rings 23 and 24 are angularly adjustable on their trunnions—as, for instance, by securing the same thereto by means of set or adjusting screws 39. These collector-rings are provided with conducting-surfaces 40, which extend only partially around the same, so that the circuit will be made only when the brushes bear against said conducting-faces. This is secured by making a portion of the faces of said rings of insulating material 42. We will assume that it is desired to shorten the duration of energization of the coil 3. The collector-ring 24 will be adjusted angularly on its trunnion and secured in such position that the conducting-surface thereof will not come under the brush 27 until some time after the mercury in the chambers 12 and 14 has come into contact through the opening 33—say not until said opening has passed half-way through the body of mercury. Obviously the circuit through said coil will be broken the moment that the opening 33 passes above the surface of the mercury. In this position the brush will have passed over only a fraction of the length of the conducting-surface 40 on the collector-ring 24; but the circuit will, nevertheless, be broken in the mercury-chambers. As a consequence the coil 3 will have been energized for only about half of the period of time it took the openings 33 to pass through the mercury body. By adjusting the collector-ring 24 on its trunnion in the manner described the period of energization of the coil 3 can be varied from an almost infinitesimal space of time to the time it takes the opening 33 to sweep entirely through the mercury. In the same manner the collector-ring 23 can be angularly adjusted on its trunnions to secure the required duration of energization of the coil 2. By the adjustment of these two collector-rings, therefore, it is possible to energize the coil 3 for only a small period of time, so as to get a light return stroke, and to energize the coil 2 for a longer period of time, so as to get a strong quick working stroke. In this manner the greatest efficiency of the motor is obtained and with a minimum expenditure of electrical energy.

The operation of the system will be readily understood from the foregoing description.

The means for securing the two adjustments described may of course be varied within wide limits without departing from the spirit of my invention.

What I claim is—

1. In an electric-motor system, the combination of a reciprocating motor provided with one coil for giving the working stroke and another coil for giving the return stroke, circuits therefor, and a circuit interrupter and changer arranged to break the circuits and make them alternately through said coils, said circuit interrupter and changer being provided with adjustable means to vary the time at which one or both of said coils is energized.

2. In an electric-motor system, the combination of a reciprocating motor provided with one coil for giving the working stroke and another coil for giving the return stroke, circuits therefor, and a circuit interrupter and changer arranged to break the circuits and make them alternately through said coils, said circuit interrupter and changer being provided with adjustable means for regulating the moment of energization of the coil giving the working stroke.

3. In an electric-motor system, the combination of a reciprocating motor provided with a core and with one coil for giving the working stroke and another coil for giving the return stroke, circuits therefor, and a circuit interrupter and changer arranged to break the circuits and make them alternately through said coils, said circuit interrupter and changer being provided with adjustable means for varying the moment of energization of the coil giving the working stroke, whereby said coil will be energized the instant the core reaches the limit of its return stroke.

4. In an electric-motor system, the combination of a reciprocating motor provided with a core and one coil for giving the working stroke and another coil for giving the return stroke, circuits therefor, and a circuit interrupter and changer arranged to break the circuits and make them alternately through said coils, said circuit interrupter and changer being provided with adjusting means for varying the moment of energization of the coils thereby to energize the coils in exact synchronism with the reciprocating core.

5. In an electric-motor system, the combination of a reciprocating motor provided with one coil for giving the working stroke and another coil for giving the return stroke, circuits therefor, and a circuit interrupter and changer arranged to break the circuits and make them alternately through said coils, said circuit interrupter and changer being provided with adjustable means whereby the duration of the energization of one or both coils may be varied.

6. In an electric-motor system, the combination of a reciprocating motor provided with one coil for giving the working stroke and another coil for giving the return stroke, circuits therefor, and a circuit interrupter and changer to break the circuits and make them alternately through said coils, said circuit interrupter and changer being so arranged that the circuit may be continued to the working coil longer than to the return-coil.

7. In an electric-motor system, the combination of a reciprocating motor provided with one coil for giving the working stroke and another coil for giving the return stroke, circuits therefor, and a circuit interrupter and changer arranged to break the circuits and make them alternately through said coils, said circuit interrupter and changer being provided with adjustable means for regulating the time of closing the circuit to one or both coils and for independently varying the same.

8. In an electric-motor system, the combination of a reciprocating motor provided with one coil for giving the working stroke and another coil for giving the return stroke, circuits therefor, and a circuit interrupter and changer arranged to break the circuits and make them alternately through said coils, said circuit interrupter and changer being provided with adjustable means for varying the time of closing the circuit to said coils and with independent means for breaking the circuits through said coils.

9. In an electric-motor system, the combination of a reciprocating motor provided with one coil for giving the working stroke and another coil for giving the return stroke, circuits therefor, and a circuit interrupter and changer arranged to break the circuits and make them alternately through said coils, said circuit interrupter and changer being provided with independently-adjustable means for regulating the time of closing the circuits to the two coils and with separate means for breaking the circuits through said coils.

10. In an electric-motor system, the combination of a reciprocating motor provided with one coil for giving the working stroke and another coil for giving the return stroke, circuits therefor, and a circuit interrupter and changer arranged to break the circuits and make them alternately through said coils, said circuit interrupter and changer being provided with adjustable means for regulating the time of closing the circuit to the coil giving the working stroke, and with independent adjustable means for varying the duration of the energization of the coils.

In testimony whereof I, the said ADOLPH F. CHRISTMAS, have hereunto set my hand.

ADOLPH F. CHRISTMAS.

Witnesses:
 ROBERT C. TOTTEN,
 G. C. RAYMOND.